United States Patent
Shotey et al.

(10) Patent No.: US 10,305,216 B1
(45) Date of Patent: May 28, 2019

(54) THIN FILM ELECTRICAL OUTLET COVER INSERT

(71) Applicant: IBO PARTNERS, LLC, Scottsdale, AZ (US)

(72) Inventors: Michael J. Shotey, Scottsdale, AZ (US); David Jonathan Zook, Scottsdale, AZ (US)

(73) Assignee: IBO Partners, LLC, Scottsdale, AZ (US)

( * ) Notice: Subject to any disclaimer, the term of this patent is extended or adjusted under 35 U.S.C. 154(b) by 0 days.

(21) Appl. No.: 15/656,935

(22) Filed: Jul. 21, 2017

Related U.S. Application Data

(60) Provisional application No. 62/367,336, filed on Jul. 27, 2016.

(51) Int. Cl.
| | |
|---|---|
| *H01R 13/512* | (2006.01) |
| *H01R 25/00* | (2006.01) |
| *H01H 23/04* | (2006.01) |

(52) U.S. Cl.
CPC .......... *H01R 13/512* (2013.01); *H01H 23/04* (2013.01); *H01R 25/006* (2013.01)

(58) Field of Classification Search
None
See application file for complete search history.

(56) References Cited

U.S. PATENT DOCUMENTS

| | | | |
|---|---|---|---|
| 4,353,759 A | 10/1982 | Stallings | |
| 5,180,886 A * | 1/1993 | Dierenbach | H02G 3/14 |
| | | | 174/66 |
| 5,384,428 A * | 1/1995 | Luu | H01R 13/6666 |
| | | | 174/66 |
| 6,160,219 A | 12/2000 | Maltby et al. | |
| 6,364,673 B1 * | 4/2002 | Lee | H01R 13/4532 |
| | | | 174/67 |
| 6,680,438 B1 | 1/2004 | Campbell et al. | |
| RE40,600 E * | 12/2008 | Maltby | H02G 3/126 |
| | | | 174/66 |

(Continued)

OTHER PUBLICATIONS

Socketops in 13 Finishes for Leviton receptacles, https://www.arnev.com/Socketop-Peel-and-Stick.html?xid=wAJu1KvUaRc1xZ9F8Mopb5ufPUwOAc9O.

(Continued)

*Primary Examiner* — Tho D Ta
(74) *Attorney, Agent, or Firm* — Schmeiser, Olsen & Watts, LLP

(57) ABSTRACT

An electrical outlet cover assembly includes a face plate and a cover plate having an electrical outlet opening sized to receive an outlet face therethrough. The face plate includes a base and at least one outlet face cavity. The cavity may extend forward of the base and include a continuous sidewall surrounding the cavity between the base and at least one face cover enclosing a front end of the cavity, and may be sized to receive the outlet face therein. A plurality of plug apertures may extend through the face cover and be positioned to align with corresponding plug apertures in the outlet face. The base may include a ridge extending outward from the sidewall behind the cover plate and in front of a yoke of the electrical outlet at an angle substantially perpendicular to the sidewall, the ridge comprising a ridge width larger than its thickness.

20 Claims, 10 Drawing Sheets

(56) References Cited

U.S. PATENT DOCUMENTS

| | | |
|---|---|---|
| 8,658,893 B1 | 2/2014 | Shotey et al. |
| 2006/0086525 A1 | 4/2006 | Xu et al. |
| 2008/0289844 A1* | 11/2008 | Dutton, Jr. ............... H02G 3/14 174/66 |
| 2011/0261511 A1 | 10/2011 | Alderson et al. |
| 2013/0118771 A1* | 5/2013 | Tonnesen ................ H02G 3/14 174/66 |
| 2015/0279243 A1 | 10/2015 | Willes |

OTHER PUBLICATIONS

Leviton Presents: How to Change a Renu® Wall Outlet Color, https://www.youtube.com/watch?v=J79eiBqpWTY Publication Date: Jan. 11, 2011; Date Accessed: Apr. 19, 2016.

Clown Fish Single Duplex Peel and Stick Outlet Wall Plate Cover, http://www.houzz.com/photos/10327872/Clown-Fish-Single-Duplex-Peel-and-Stick-Outlet-Wall-Plate-Cover-tropical-switch-plates-and-outlet-covers.

Bronze-Black Frame Single Duplex SwitchStix Peel and Stick Outlet Wall Plate Cover Décor, http://www.amazon.com/Bronze-Black-Single-Duplex-SwitchStix-Outlet/dp/B00GABS3DO/.

Vinyl Peel and Stick Champagne Outlet Cover (2-Pack), http://www.homedepot.com/p/Aspect-Vinyl-Peel-and-Stick-Champagne-Outlet-Cover-2-Pack-B48-51/204379788.

\* cited by examiner

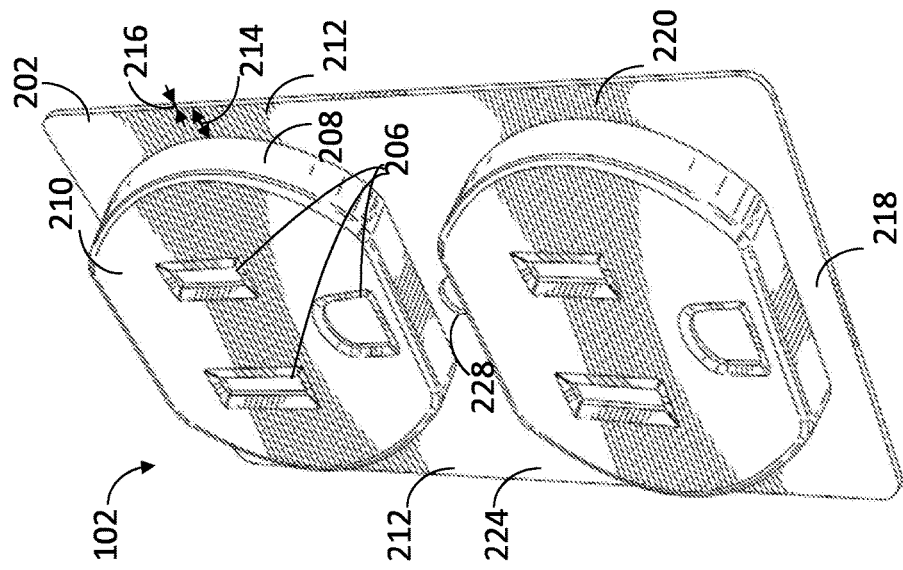
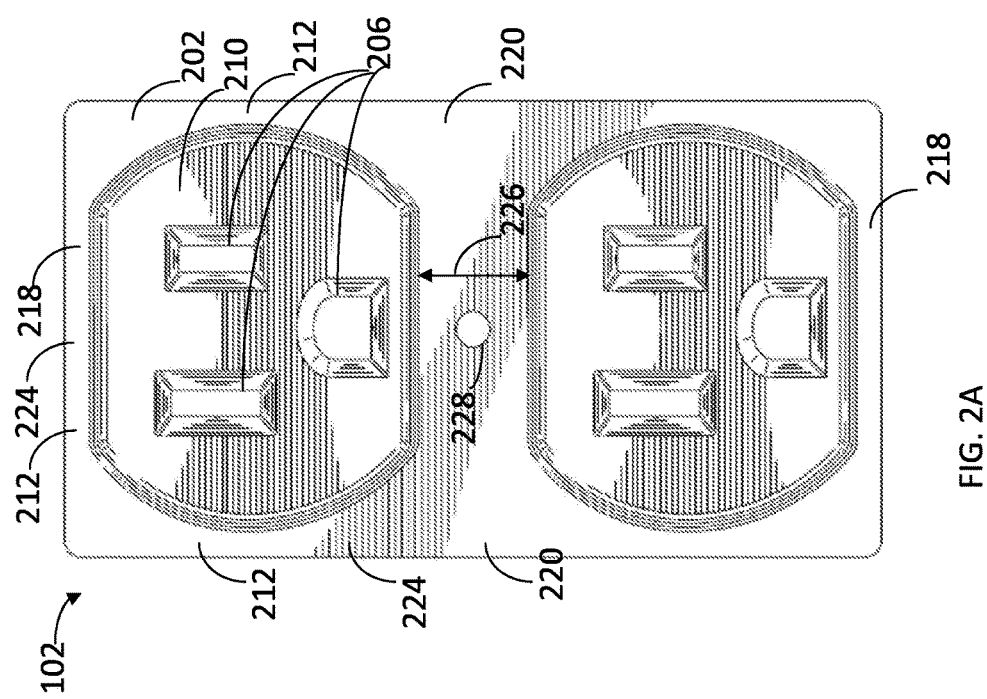
FIG. 2A
FIG. 2B

THIN FILM ELECTRICAL OUTLET COVER INSERT

CROSS-REFERENCE TO RELATED APPLICATIONS

This application claims the benefit of U.S. Provisional Patent No. 62/367,336, entitled "THIN FILM ELECTRICAL OUTLET COVER INSERT," which was filed on Jul. 27, 2016, the disclosure of which is hereby incorporated herein by this reference.

TECHNICAL FIELD

Aspects of this document relate generally to covering an outlet, and more specifically to a face plate for covering the face of an outlet.

BACKGROUND

Electrical outlets come in a variety of shapes and colors. When a homeowner desires to change the color of an electrical outlet, however, it is conventionally a tedious and expensive process.

Conventional electrical outlets are made of several components, including a wall box and an outlet (also called a receptacle), which is typically composed of pairs of sockets and a yoke. The outlet receptacle is typically attached to the wall box that is typically attached to a framing member inside the wall, and is accessible through a hole cut in the wall. A cover plate having apertures to allow the sockets to protrude is installed over these components, typically with one or two screws. Electrical devices are plugged in by inserting the plug blades through aligned apertures in the cover plate and socket.

A cover plate is installed after construction. It is a common practice to remove the cover plate during remodeling or redecorating so that it does not become damaged or defaced with paint drips and splatters, wallpaper paste, or other decorating materials. The conventional cover plate is easily removed by unscrewing the screw or screws that attach it directly to the receptacle. The receptacle, however, usually is not removed during remodeling or redecorating because it is hard-wired into the building's electrical system. Consequently, the receptacle and sockets are left exposed and the faces of the sockets become covered with paint splatters and the like. If not cleaned immediately, the face may become permanently defaced, thereby making the electrical outlet more unsightly and conspicuous. Repeated paintings only make the problem worse. Reinstalling the cover plate then emphasizes the paint-splattered surface of the outlet, as the defaced socket surface is compared to the pristine surface of the cover plate.

Cover plates are now available in a variety of colors and decorating textures to more closely go with any decor, and sometimes are even covered with wallpaper to match the wall. The underlying receptacles and cover plates are, however, made in standard colors, usually white, ivory, beige, and dark brown with other colors available at a higher cost, and unfortunately do not match many decorative cover plates. Because most cover plates allow the face of the sockets to be exposed, the sockets mismatch with cover plates and cause the outlets to be more conspicuous. But a homeowner generally is required to hire an electrical contractor to change existing receptacles to a new color to match the cover plates. Many, therefore, do not replace the receptacles due to the difficulty and cost associated with the change.

SUMMARY

According to one aspect of the disclosure, an electrical outlet cover assembly comprises a cover plate and a face plate. The cover plate has an electrical outlet opening sized to receive an electrical outlet face therethrough. The face plate comprises a base and at least one electrical outlet face cavity. The electrical outlet face cavity may extend forward of the base and comprise a continuous sidewall surrounding the at least one cavity between the base and at least one face cover enclosing a front end of the at least one cavity. The at least one cavity may be sized to receive the electrical outlet face therein. A plurality of plug apertures may extend through the at least one face cover and be positioned to align with corresponding plug apertures in the electrical outlet face. The base may comprise a ridge extending outward from the sidewall behind the cover plate and in front of a yoke of the electrical outlet at an angle substantially perpendicular to the sidewall, the ridge comprising a ridge width larger than its thickness.

Particular embodiments may comprise one or more of the following features. The ridge may extend outward from the sidewall for a majority of at least two sides of the face plate. The ridge may extend outward from the sidewall for a majority of at least four sides of the face plate. The face plate may be rectangular in shape and comprise first and second shorter sides and first and second longer sides, the longer sides having lengths longer than the shorter sides, and wherein the ridge may extend outward farther on the longer sides than on the shorter sides. The ridge width may be at least ⅛". The face plate may be rectangular in shape and comprise first and second shorter sides and first and second longer sides, the longer sides having lengths longer than the shorter sides, and wherein the ridge may extend outward farther on the shorter sides than on the longer sides. The ridge on the shorter sides may comprise a box mounting screw opening in the ridge on each of the shorter sides. The ridge may be formed of a plurality of ridge segments each extending outward from the sidewall at an angle substantially perpendicular to the sidewall for the ridge width larger than its thickness. The at least one electrical outlet face cavity may comprise two electrical outlet face cavities extending forward of the base on the face plate, separated from each other by a gap, and wherein the base may comprise a screw aperture extending through the base between the two electrical outlet face cavities. The outlet face cavity may comprise a depth substantially equal to a height of the electrical outlet face and when the face plate is positioned on the electrical outlet face, the base of the face plate may rest against a base of the electrical outlet face and the ridge may extend outward in front of the base of the electrical outlet face. The outlet face cavity may comprise a depth substantially equal to a height of the electrical outlet face and when the face plate is positioned on the electrical outlet face, the base of the face plate may rest against a base of the electrical outlet face and the ridge may extend outward in front of the yoke of the electrical outlet. The cover plate may further comprise at least one screw opening through the cover plate.

According to one aspect of the disclosure, a face plate for an electrical outlet cover assembly comprises a substantially planar base; at least one face cover substantially parallel to the base, and at least one continuous sidewall beginning at the base and ending at the face cover. The at least one face cover comprises a plurality of plug apertures extending through the face cover and aligned with corresponding plug apertures in a face of an electrical outlet. The at least one continuous sidewall may have a thickness less than 20 mils and extending between the base and the at least one face cover. The at least one continuous sidewall and the at least one face cover may define at least one electrical outlet face cavity existing forward of the substantially planar base. The base may further comprise a ridge extending outward from the beginning of the sidewall at an angle substantially perpendicular to the sidewall.

Particular embodiments may comprise one or more of the following features. The ridge may extend outward from the sidewall for a majority of at least two sides of the face plate. The ridge may extend outward from the sidewall for a majority of at least four sides of the face plate. The face plate may be rectangular in shape and may comprise first and second shorter sides and first and second longer sides, the longer sides having lengths longer than the shorter sides, and wherein the ridge may extend outward farther on the longer sides than on the shorter sides. The ridge width may be at least ⅛". The face plate may be rectangular in shape and comprise first and second shorter sides and first and second longer sides, the longer sides having lengths longer than the shorter sides, and wherein the ridge may extend outward farther on the shorter sides than on the longer sides. The ridge on the shorter sides may comprise a box mounting screw opening in the ridge on each of the shorter sides. The ridge may be formed of a plurality of ridge segments each extending outward from the sidewall at an angle substantially perpendicular to the sidewall for the ridge width larger than its thickness. The at least one electrical outlet face cavity may comprise two electrical outlet face cavities extending forward of the base on the face plate, separated from each other by a gap, and wherein the base may comprise a screw aperture extending through the base between the two electrical outlet face cavities. The outlet face cavity may comprise a depth substantially equal to a height of an electrical outlet face and when the face plate is positioned on the electrical outlet face, the base of the face plate may rest against a base of the electrical outlet face and the ridge may extend outward in front of the base of the electrical outlet face. The outlet face cavity may comprise a depth substantially equal to a height of the electrical outlet face and when the face plate is positioned on the electrical outlet face, the base of the face plate may rest against a base of the electrical outlet face and the ridge may extend outward in front of a yoke of the electrical outlet.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 2A shows the front view of a face plate;

FIG. 2B shows the front perspective view of the face plate shown in FIG. 2A;

DETAILED DESCRIPTION

Figure 1A:
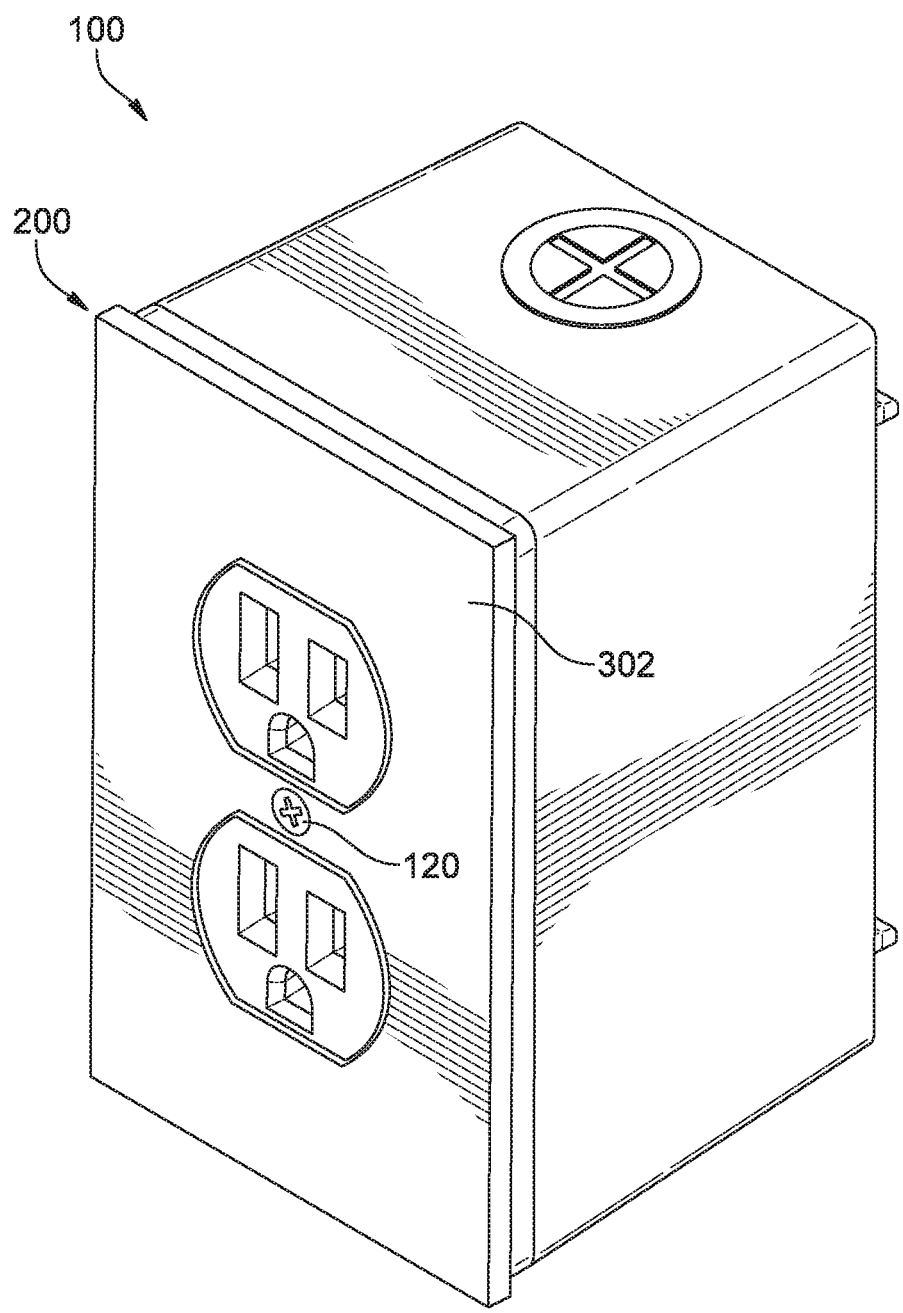
FIG. 1A shows a perspective view of an outlet assembly.

The problem of defacing electrical receptacles during painting and of a desire to change the color of a receptacle without changing the receptacle itself is age-old. Nevertheless, a simple, easily-installed, inexpensive face plate to make existing outlets more attractive and to match the homeowner's room décor has evaded invention. There has existed a long-felt need for a simple, inexpensive way to make electrical outlets more attractive, without having to resort to replacing the receptacle or entire wall box assembly.

This disclosure, its aspects and implementations, are not limited to the specific face plate or material types, or other system component examples, or methods disclosed herein. Many additional components, manufacturing and assembly procedures known in the art consistent with face plate manufacture are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example" or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Figure 1B:
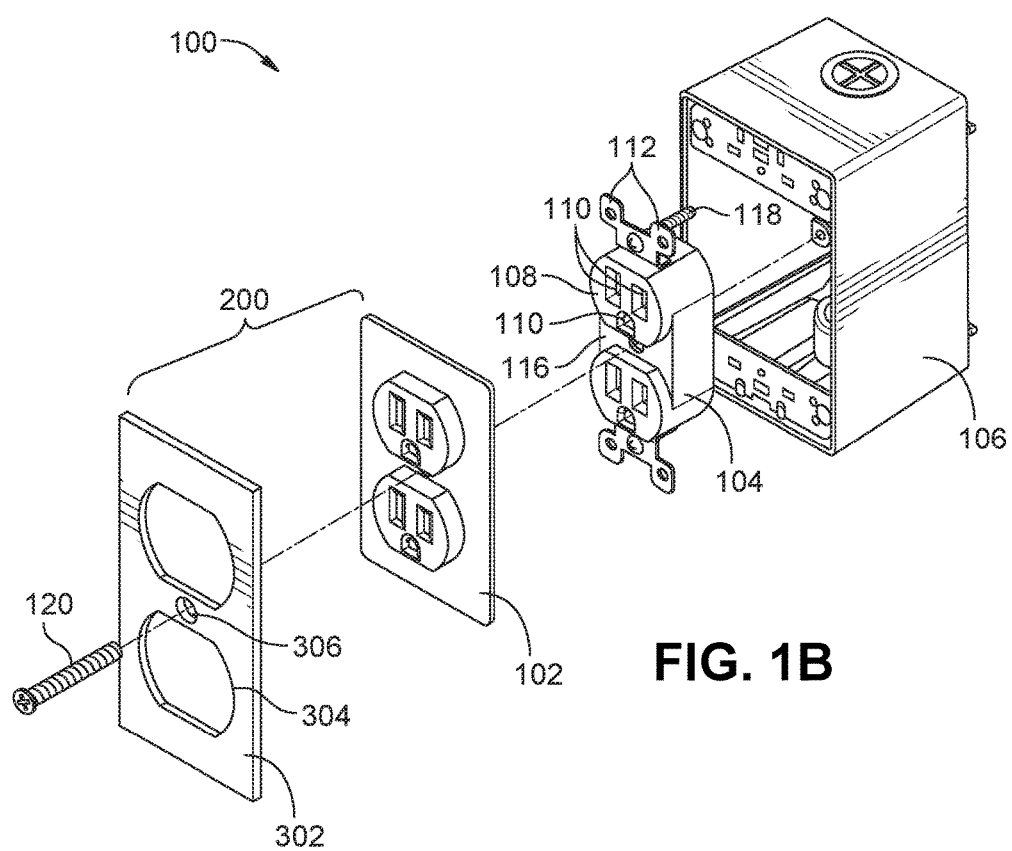
FIG. 1B shows an exploded view of the outlet assembly shown in FIG. 1A.
Figure 2C:
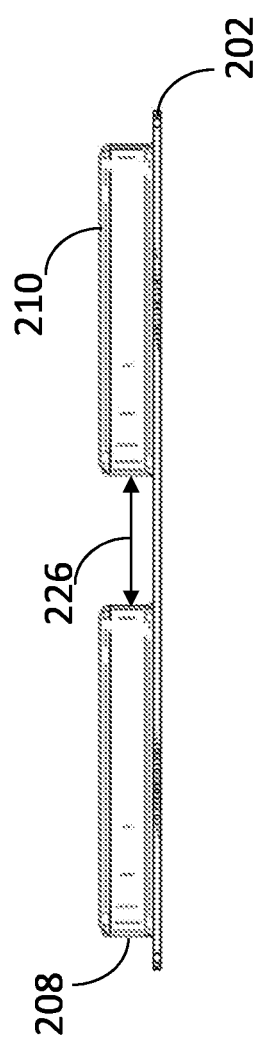
FIG. 2C shows the side view of the face plate shown in FIG. 2A.
Figure 2D:
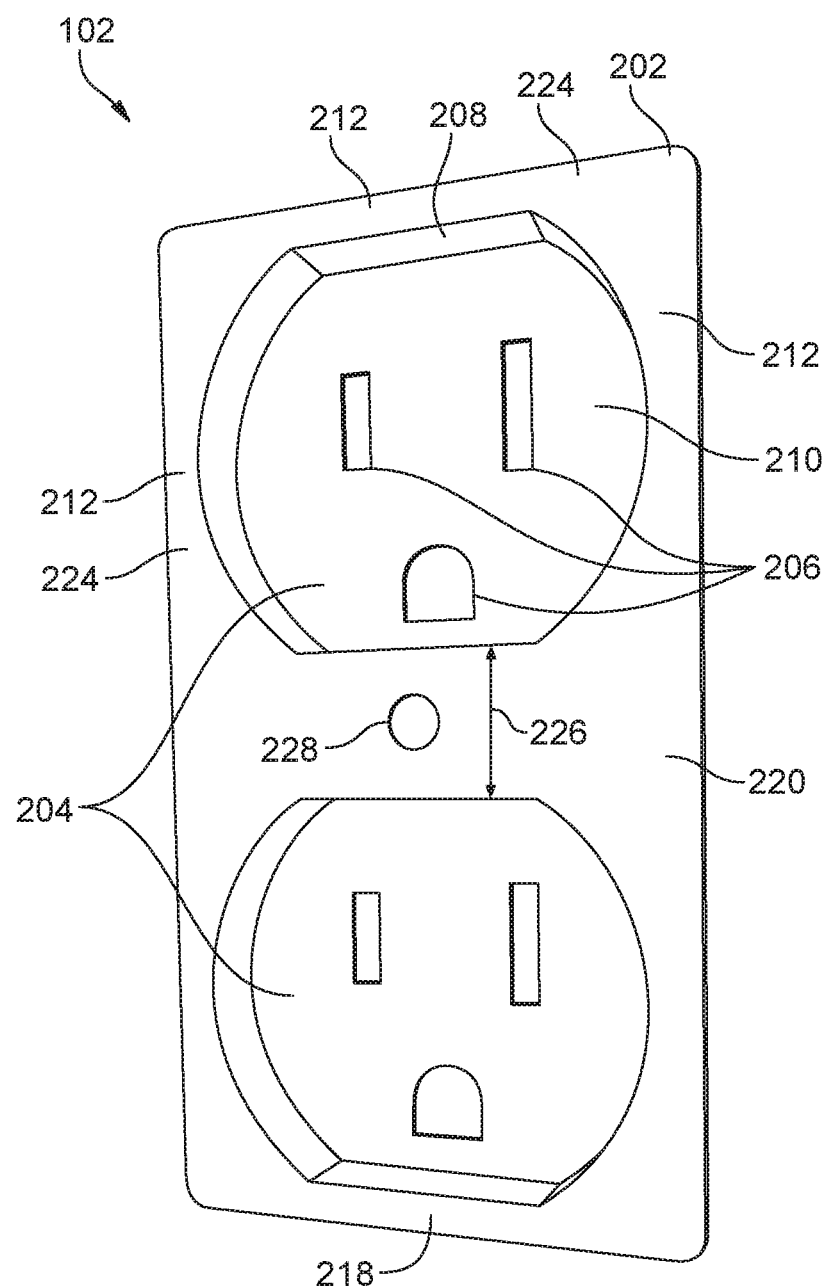
FIG. 2D shows the rear perspective view of the face plate shown in FIG. 2A.

The present disclosure relates to face plates for electrical receptacles. It is contemplated that a face plate provides a simple solution to changing the color of an electrical receptacle to match any color décor of a wall or room, without the need to replace the electrical receptacle itself. For example, FIGS. 1A and 1B show an electrical outlet assembly or outlet assembly 100 including a non-limiting embodiment of an electrical outlet cover assembly or outlet cover assembly 200 and an exploded view of the outlet assembly 100; FIGS. 2A-2D show the front, front perspective, side, and rear perspective views of a non-limiting embodiment of an electrical receptacle face plate, a face plate, or an outlet cover insert 102. An outlet assembly 100 comprises an outlet cover assembly 200; an electrical outlet, outlet, electrical receptacle, or receptacle 104; and an electrical mounting box 106.

An electrical outlet cover assembly 200 comprises a cover plate 302 and a face plate 102. The cover plate 302 further comprises an electrical outlet opening or outlet opening 304 sized to receive an electrical outlet face, an outlet face, a face of the outlet, a face of the electrical outlet, electrical receptacle face, or receptacle face 108 therethrough. In some instances, the cover plate 302 further comprises at least one screw opening 306 through the cover plate 302.

A face plate 102 comprises a base 202, at least one face cover 210, at least one continuous sidewall 208, and a plurality of plug apertures 206. The plug apertures 206 may extend through the at least one face cover 210 and positioned to align with the corresponding plug apertures or outlet plug apertures 110 in the electrical outlet face 108.

The face plate 102 may further comprise at least one electrical outlet face cavity, outlet face cavity, or cavity 204 sized to receive the electrical outlet face 108 therein. The outlet face cavity 204 may comprise at least one continuous sidewall 208 and at least one face cover 210 enclosing the front end of the at least one cavity 204. The sidewall 208 may begin at the base 202 and end at the face cover 210, and extend between the base 202 and the face cover 210. The sidewalls 208 and the face covers 210 may define the outlet face cavities 204. The outlet face cavity 204 may extend forward of the base 202. The sidewall 208 may surround the outlet face cavities between the base 202 and the face cover 210. In some instances, the at least one outlet face cavity 204 may comprise two outlet face cavities 204 extending forward of the base 202 on the face plate 102 (FIGS. 2A-2D). The cavities may be separated from each other by a gap 226. The base may comprise a screw aperture 228 extending through the base 202 between the cavities 204. In some instances, for a duplex receptacle where there is a recess between multiple receptacle faces, the face plate may be formed separately for each receptacle face.

The base 202 may be planar, or substantially planar. The base is substantially planar when the distance between the highest point of the base and the lowest point of the base is less than the depth 230 of the cavity 204, less than half of the depth 230 of the cavity 204, or less than one tenth of the depth 230 of the cavity 204. The base 202 may comprise a ridge 212 extending outward from the sidewall 208. The ridge 212 may extend outward from the beginning of the sidewall 208. In some instances, the ridge 212 extends outward from the sidewall 208 for a majority of at least two sides of the face plate 102. In some instances, the ridge 212 extends outward from the sidewall 208 for a majority of at least four sides of the face plate 102. The ridge 212 may be behind the cover plate 302 and in front of the yoke 112 of the outlet 104. The ridge 212 may be at an angle perpendicular or substantially perpendicular to the sidewall 208. Two surfaces or lines or a line and a surface are substantially perpendicular to each other when the angle between them is 80°-100°, 85°-95°, or 87°-92°. The ridge 212 may comprise a ridge width 214 larger than its thickness 216.

The face cover 210 may be parallel or substantially parallel to the base 202. Two surfaces or lines, or a line and a surface are substantially parallel to each other when the angle between them is −10°-10°, −5°-5°, or −2°-2°. The angle between two surfaces is the angle between the tangent planes of the two surfaces at their intersection; if the two surfaces do not intersect with each other if they are extended to infinity, the angle between them is 0° and the surfaces are parallel to each other.

Figure 5B:
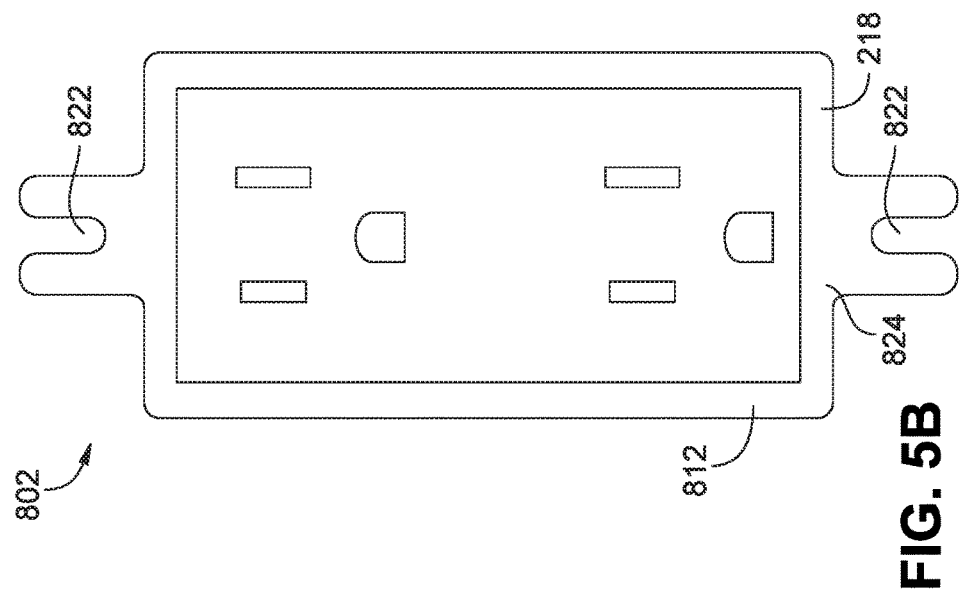
FIG. 5B shows another non-limiting embodiment of a face plate.
Figure 5A:
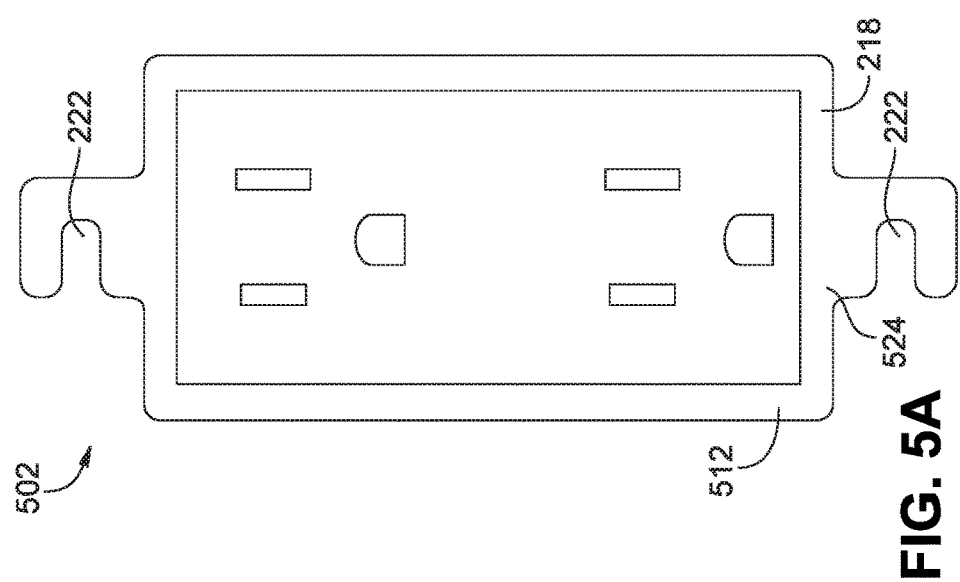
FIG. 5A shows a non-limiting embodiment of a face plate.

In some instances, the face plate 102 is rectangular in shape and comprises first and second shorter sides 218 and first and second longer sides 220. The longer sides 220 have lengths longer than the shorter sides 218. The ridge 212 may extend outward farther on the longer sides 220 than on the shorter sides 218, or extend outward farther on the shorter sides 218 than on the longer sides 220. The ridge 512, 812 on the shorter sides 218 may comprise a box mounting screw opening 222, 822 in the ridge on each of the shorter sides 218 (FIGS. 5A-5B). In some instances, the ridge width 214 is at least ⅛". In some instances, the ridge is formed of a plurality of ridge segments 224. Each of the ridge segments may extend outward from the sidewall 208 at an angle substantially perpendicular to the sidewall 208 for the ridge width 214 larger than the ridge thickness 216.

Figure 3A:
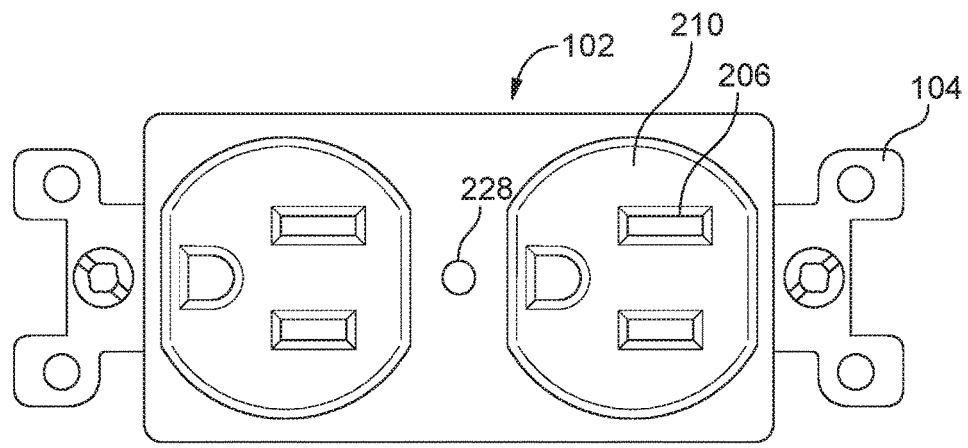
FIG. 3A shows the front view of an assembly of a face plate placed on an outlet.
Figure 3B:
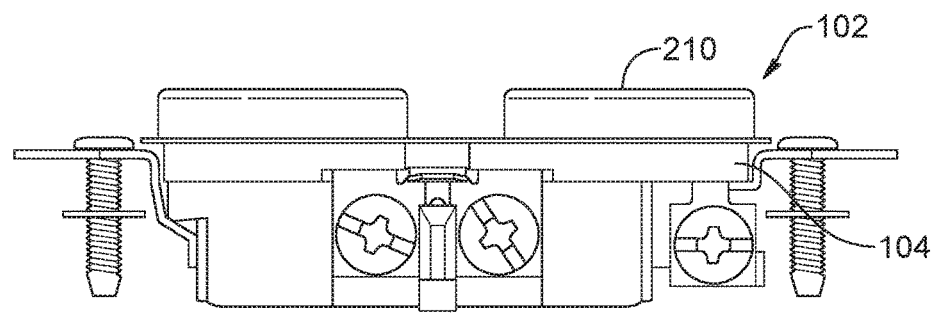
FIG. 3B shows the side view of the assembly shown in FIG. 3A.
Figure 7A:
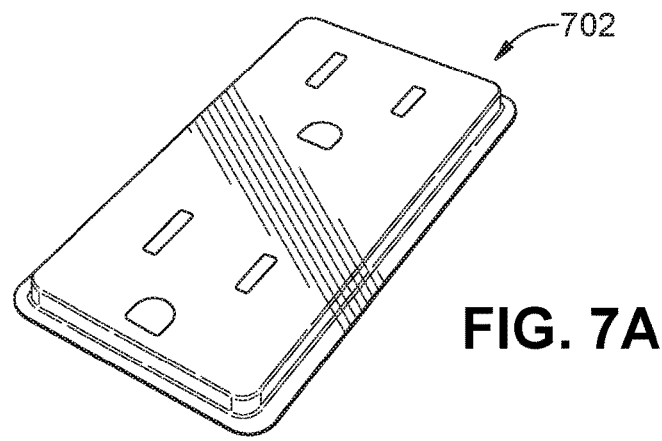
FIG. 7A shows a non-limiting embodiment of a face plate configured to couple with a decora outlet.
Figure 7B:
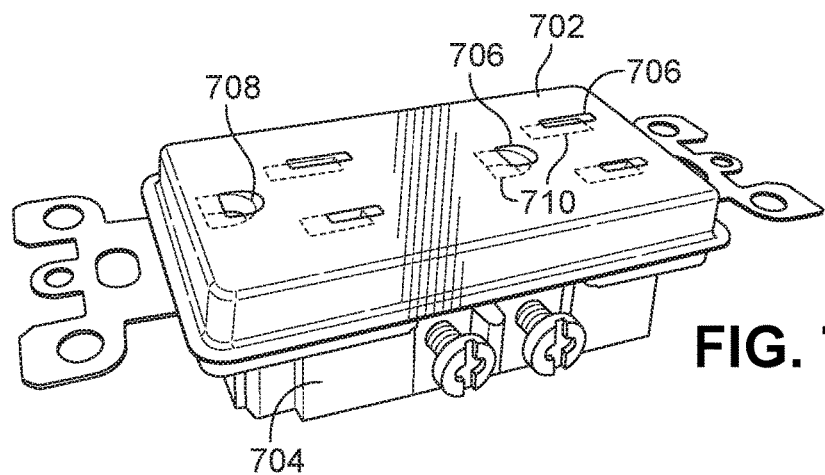
FIG. 7B shows the face plate shown in FIG. 7A coupled with a decora outlet.

To change the color or design of an outlet face, a face plate may be placed on the outlet face (FIGS. 3A-3B, and 7B). For example, FIGS. 3A and 3B show the front and side views of a face plate 102 placed on an electrical outlet 104. The face cover 210 may cover the outlet face 108. The plug aperture 206 aligns with corresponding plug apertures 110 on the outlet 104.

Figure 6:
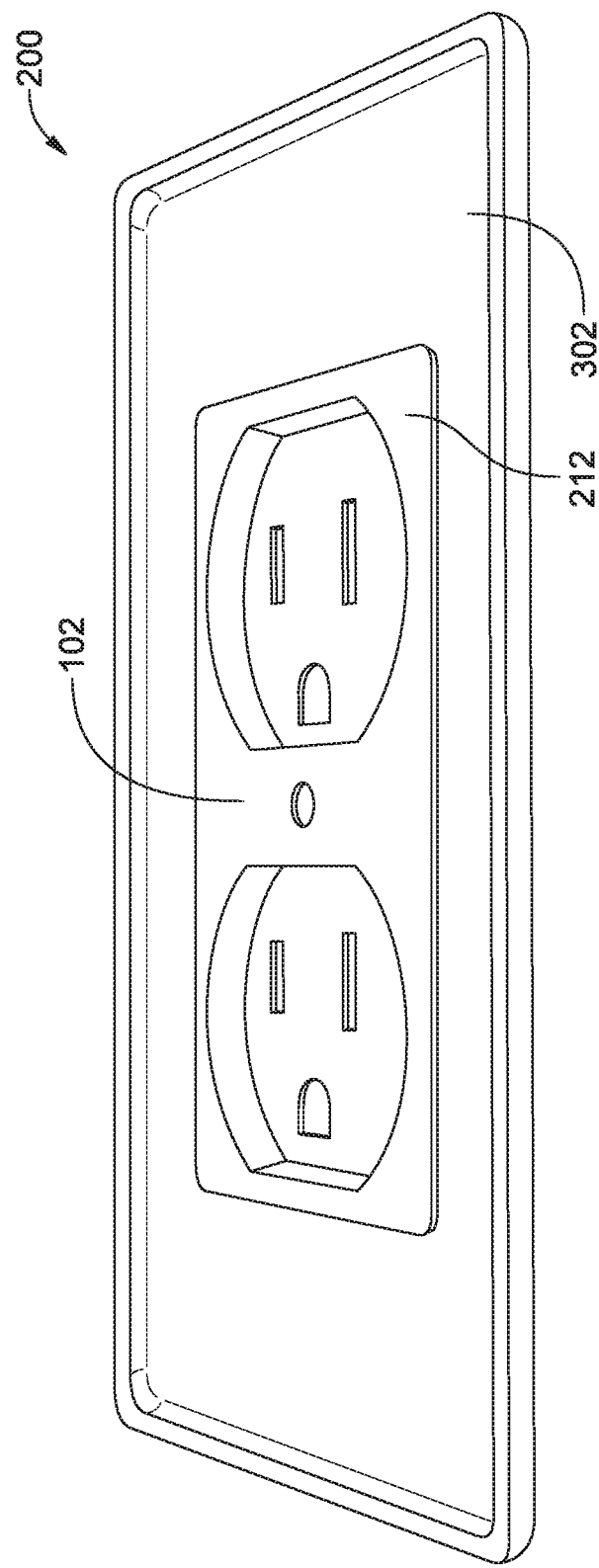
FIG. 6 shows the rear perspective view of an outlet cover assembly.

When the electrical outlet cover assembly 200 is coupled with an outlet 104, the cover plate 302 may hold the ridge 212 in place and discourage the face plate from being pulled out of the cover plate 302 when the power plug is being pulled out of the outlet. The ridge 212 of the face plate 102 may extend around the opening and assist in retaining the face plate 102 against the cover plate 302 when in use. For example, FIG. 6 shows a rear perspective view of an outlet cover assembly 200 where the ridge 212 of the face plate 102 extends around the outlet opening 304 (not shown) of the cover plate 302. Although the ridge is shown continuous around the edge of the face plate, it should be understood that a continuous ridge is not required. Other ridge embodiments may comprise a discontinuous ridge or a ridge segment that extends out only at selected positions around the edge of the face plate, like at the corners and/or at the top and bottom of the face plate.

In some instances, the ridge segments 524, 824 may extend and form box mounting screw openings 222, 822 that allow box mounting screws to go through and the cover plate and the face plate to be retained together with the outlet (e.g., the face plates 502 and 802 shown in FIGS. 5A-5B). The box mounting screw opening 222, 822 may be sized to allow a box mounting screw 118 to go through. The size of the box mounting screw opening 222, 822 may be slightly bigger than the diameter of the box mounting screw 118 so that the box mounting screw opening 222, 822 fits around the box mounting screw 118 and the ridge provides additional forces to limit the face plate 502, 802 or part of the face plate 502, 802 from coming out of and above the cover plate.

Figure 4A:
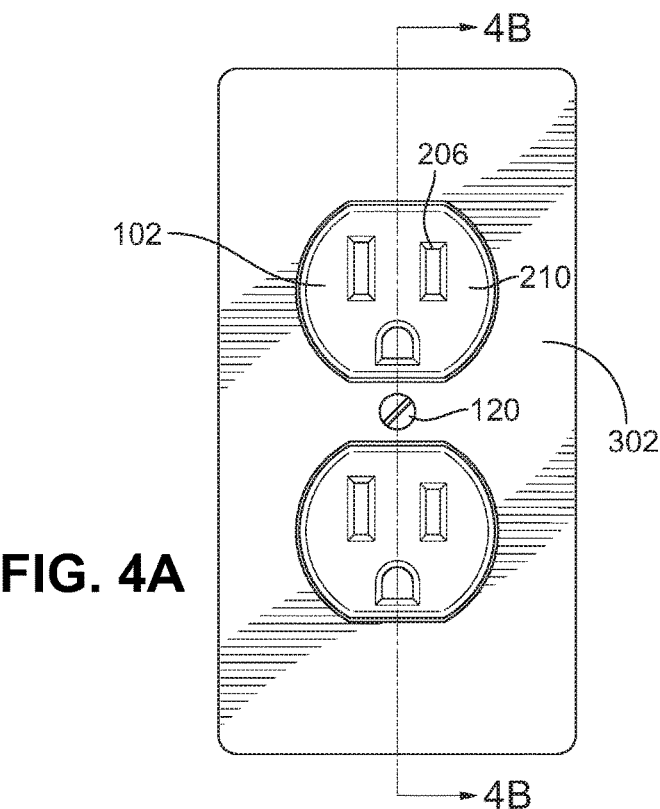
FIG. 4A shows the front view of an outlet assembly.
Figure 4B:
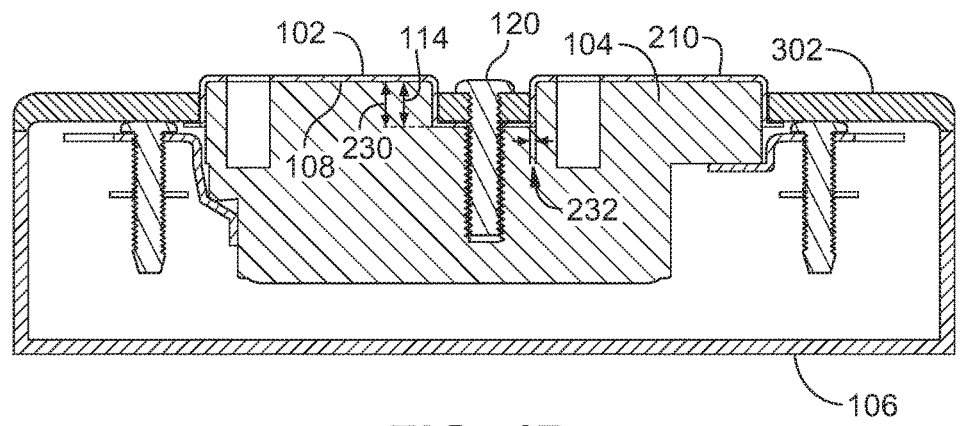
FIG. 4B shows the mid-sectional side view of the outlet assembly shown in FIG. 4A.

The face plate 102 may also be discouraged from coming out of the cover plate 302 by a device screw 120. The cover plate 302 may be placed over the face plate 102 and coupled with the outlet 104 through a device screw 120 (FIGS. 4A and 4B). For example, FIGS. 4A and 4B illustrate an example of an assembly of an outlet 104, a cover plate 302, and a face plate 102.

The face plate 102 may also be discouraged from coming out of the cover plate 302 by the configuration of the face plate 102 (FIGS. 4A and 4B). The cavity 204 may comprise a depth 230 equal or substantially equal to the height 114 of the electrical outlet face 108. Two distances are substantially equal to each other when the difference between the two distances is less than 40 mils (0.04 inch), less than 20 mils (0.02 inch), or less than 10 mils (0.01 inch). In some instances, when the face plate 102 is positioned on the electrical outlet face 108, the base 202 of the face plate 102 may rest against the base 116 of the electrical outlet face 108 and the face plate 102 may be held tightly to the outlet by the ridges 212 held in place by the cover plate 302. In some instances, when the face plate 102 is positioned on the electrical outlet face 108, the ridge 212 may extend outward in front of the base 116 of the electrical outlet face 108. In some instances, when the face plate 102 is positioned on the electrical outlet face 108, the ridge 212 may extend outward in front of the yoke 112 of the electrical outlet 104.

Figure 7C:
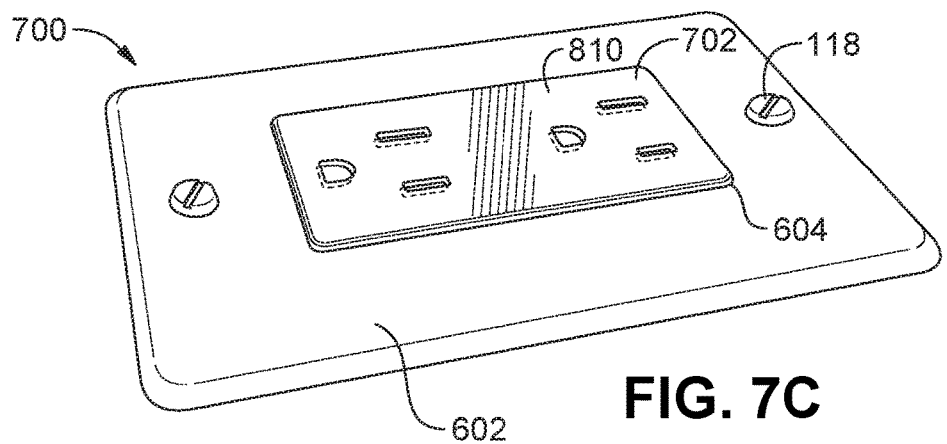
FIG. 7C shows an outlet assembly comprising a cover plate placed over the assembly shown in FIG. 7B.

Although shown in FIGS. 1-4B and 6 as an embodiment configured to match the size, shape, and dimensions of a standard 15 amp, 125 volt duplex-style receptacle, the face plate may be manufactured according to the size, shape, and dimensions of any receptacle face including, without limitation, decora, round, GFCI, and for any voltage or prong configuration. For example, FIGS. 5A-5B and 7A-7C show a non-limiting embodiment of a face plate 702 configured to be placed on a decora receptacle 704. FIG. 7A shows the face plate 702. FIG. 7B shows the face plate 702 being placed on the receptacle face 708 of receptacle 704, where the plug apertures 706 are aligned with the corresponding plug apertures 710 on the outlet 704. FIG. 7C shows that a cover plate 602 is placed over the assembly shown in FIG. 7B, where the cover plate 602 receives the face cover 810 of the face plate 702 through the outlet opening 604 of the cover plate 602 and the outlet cover assembly 700 is further retained on the outlet 704 through the box mounting screws 118.

The gap between the face plate and the cover plate opening may be small so that the face plate combined with the receptacle and the cover plate makes the cover plate appear to be almost continuous with the face plate without noticeable gaps between the two (FIGS. 1A, 4A-4B, and 7C). This adds to the attractive appearance of the outlet cover assembly, helps to hide the color of the underlying receptacle, and assists in retaining the face plate and its ridges against the outlet face during use of the receptacle.

Although the particular configurations shown in FIGS. 1-4B, 6, and 7A-7C result in a rectangular shape of the face plate, it will be understood by those of ordinary skill in the art that the overall peripheral shape of the face plate and corresponding ridge may be any shape, including, without limitation, rectangular, round, square, or any other shape, including shapes corresponding to the shape of the receptacle face to which the receptacle face plate is configured for application (e.g., FIGS. 5A-5B). In some instances, the face plate may be configured to couple with a multi-gang outlet installation, where the outlet comprises two or more gangs of outlets and the face plate comprises a multi-gang application with one application of a face plate coupled with one gang of outlets.

The face plate may be made of plastic, acrylonitrile butadiene styrene (ABS), polyvinyl chloride (PVC), or other suitable material known to a person skilled in the art. The face plate may be clear or colored. Where the face plate is clear, the internal surface and/or external surface of the plastic may be painted by the user to match the wall paint color or any other color desired. The internal and/or external surface of the face plate may also be molded with a textured surface to assist with paint adhesion or any other purposes.

The thickness of the face plate may vary at its various parts. The face plate is formed with a side wall thin enough to fit between the edge of the receptacle face and the receptacle cover plate. The thickness 232 of the sidewall may be less than 20 mils, less than 10 mils, or less than 6 mils. In some instances, the thickness of the side wall may be 8 mils. The thickness of the front of the face plate and the ridge may be thicker than 10 mils if desired and if the manufacturing technique used allows for differing thicknesses on different parts of the face plate. The face plate may be manufactured by vacuum-forming face plates in a mold, or injection molding. Both allow for thin wall thicknesses, apertures, and shapes needed for various receptacle shapes, sizes, and configurations.

It will be understood that the embodiments disclosed are not limited to the specific components disclosed herein, as virtually any components consistent with the intended operation of a method and/or system implementation for such an embodiment may be used. Accordingly, for example, although particular component examples may be disclosed, such components may be comprised of any shape, size, style, type, model, version, class, grade, measurement, concentration, material, weight, quantity, and/or the like consistent with the intended purpose, method and/or system of implementation.

In places where the description above refers to particular implementations or embodiments, it should be readily apparent that a number of modifications may be made without departing from the scope and/or spirit thereof and that these principles and modifications may be applied to other such embodiments. The present disclosure is to be considered as an exemplification of the principles of the disclosed methods, apparatus, and systems. The presently-disclosed implementations are, therefore, to be considered in all respects as illustrative, and not intended to limit the broad aspect of the disclosed concepts to the embodiments illustrated. Many additional components and manufacturing and assembly procedures known in the art or consistent with face plates and outlet cover assemblies are contemplated for use with particular implementations in this disclosure. For example, although particular implementations are disclosed, such implementations and implementing components may comprise any components, models, types, materials, versions, quantities, and/or the like as is known in the art for such systems and implementing components, consistent with the intended operation. In places where the description above refers to particular implementations of face plates and outlet cover assemblies, it should be readily apparent that a number of modifications may be made without departing from the spirit thereof. All changes that come within the meaning of and range of equivalency of the description are intended to be embraced therein.

The invention claimed is:

1. An electrical outlet cover assembly comprising:
a cover plate with an electrical outlet opening sized to receive an electrical outlet face therethrough and at least one screw opening through the cover plate; and
a face plate comprising a base, at least one electrical outlet face cavity extending forward of the base and comprising a continuous sidewall having a thickness and surrounding the at least one cavity between the base and at least one face cover having a thickness and enclosing a front end of the at least one cavity the at least one cavity sized to receive the electrical outlet face therein, and a plurality of plug apertures extending through the at least one face cover and positioned to align with corresponding plug apertures in the electrical outlet face, wherein the base comprises a ridge having a thickness and extending outward from the continuous sidewall behind the cover plate and in front of a yoke of an electrical outlet at an angle substantially perpendicular to the continuous sidewall, the ridge comprising a ridge width larger than its thickness;
wherein the at least one electrical outlet face cavity comprises two electrical outlet face cavities extending forward of the base on the face plate, separated from each other by a gap, and wherein the gap comprises a screw aperture extending through the base between the two electrical outlet face cavities; and
wherein the continuous sidewall thickness is less than the face cover thickness and the ridge thickness.

2. The electrical outlet cover assembly of claim 1, wherein the ridge is formed of a plurality of ridge segments each extending outward from the continuous sidewall at an angle substantially perpendicular to the continuous sidewall for the ridge width larger than its thickness.

3. The electrical outlet cover assembly of claim 1, wherein the outlet face cavity comprises a depth substantially equal to a height of the electrical outlet face and when the face plate is positioned on the electrical outlet face, the base of the face plate rests against a base of the electrical outlet face and the ridge extends outward in front of the base of the electrical outlet face.

4. The electrical outlet cover assembly of claim 1, wherein the outlet face cavity comprises a depth substantially equal to a height of the electrical outlet face and when the face plat is positioned on the electrical outlet face, the base of the face plate rests against a base of the electrical outlet face and the ridge extends outward in front of the yoke of the electrical outlet.

5. The electrical outlet cover assembly of claim 1, wherein the ridge extends outward from the continuous sidewall for a majority of at least two sides of the face plate.

6. The electrical outlet cover assembly of claim 5, wherein the ridge extends outward from the continuous sidewall for a majority of at least four sides of the face plate.

7. The electrical outlet cover assembly of claim 1, wherein the face plate is rectangular in shape and comprises first and second shorter sides and first and second longer sides, the longer sides having lengths longer than the shorter sides, and wherein the ridge extends outward farther on the longer sides than on the shorter sides.

8. The electrical outlet cover assembly of claim 7, wherein the ridge width is at least ⅛".

9. The electrical outlet cover assembly of claim 1, wherein the face plate is rectangular in shape and comprises first and comprises first and second shorter sides and first and second longer sides, the longer sides having lengths longer than the shorter sides, and wherein the ridge extends outward farther on the shorter sides than on the longer sides.

10. The electrical outlet cover assembly of claim 9, wherein the ridge on the shorter sides comprises a box mounting screw opening in the ridge on each of the shorter sides.

11. A face plate for an electrical outlet cover assembly comprising:
a substantially planar base;
at least one face cover substantially parallel to the substantially planar base, the at least one face cover comprising a plurality of plug apertures extending through the face cover and aligned with corresponding plug apertures in a face of an electrical outlet and having a face cover thickness; and
at least one continuous sidewall beginning at the substantially planar base and ending at the face cover, the at least one continuous sidewall having a continuous sidewall thickness and extending between the substantially planar base and the at least one face cover;

wherein the at least one continuous sidewall and the at least one face cover defining at least one electrical outlet face cavity existing forward of the substantially planar base;

wherein the base further comprises a ridge having a ridge thickness and extending outward from the beginning of the at least one continuous sidewall at an angle substantially perpendicular to the at least one continuous sidewall; and wherein the at least one electrical outlet face cavity comprises two electrical outlet face cavities extending forward of the substantially planar base on the face plate, separated from each other by a gap, and wherein the gap comprises a screw aperture extending through the substantially planar base between the two electrical outlet face cavities to the face of the electrical outlet; and wherein the continuous sidewall thickness is less than the face cover thickness and the ridge thickness.

12. The face plate of claim 11, wherein the ridge is formed of a plurality of ridge segments each extending outward from the at least one continuous sidewall at an angle substantially perpendicular to the sidewall for a ridge width larger than its thickness.

13. The face plate of claim 11 wherein the outlet face cavity comprises a depth substantially equal to a height of an electrical outlet face and when the face plate is positioned on the electrical outlet face, the substantially planar base of the face plate rests against a base of the electrical outlet face and the ridge extends outward in front of the base of the electrical outlet face.

14. The face plate of claim 11, wherein the outlet face cavity comprises a depth substantially equal to a height of the electrical outlet face and when the face plate is positioned on the electrical outlet face, the substantially planar base of the face plate rests against a base of the electrical outlet face and the ridge extends outward in front of a yoke of the electrical outlet.

15. The face plate of claim 11, wherein the ridge extends outward from the at least one continuous sidewall for a majority of at least two sides of the face plate.

16. The face plate of claim 15, wherein the ridge extends outward from the at least one continuous sidewall for a majority of at least four sides of the face plate.

17. The face plate of claim 11 wherein the face plate is rectangular in shape and comprises first and second shorter sides and first and second longer sides, the longer sides having lengths longer than the shorter sides, and wherein the ridge extends outward farther on the longer sides than on the shorter sides.

18. The face plate of claim 17, wherein the ridge width is at least 1/8".

19. The face plate of claim 11, wherein the face plate is rectangular in shape and comprises first and second shorter sides and first and second longer sides, the longer sides having lengths longer than the shorter sides, and wherein the ridge extends outward farther on the shorter sides than on the longer sides.

20. The face plate of claim 19, wherein the ridge on the shorter sides comprises a box mounting screw opening in the ridge on each of the shorter sides.

* * * * *